US008544018B2

(12) United States Patent  (10) Patent No.: US 8,544,018 B2
Gobara et al.  (45) Date of Patent: Sep. 24, 2013

(54) COMMUNICATION SYSTEM, INFORMATION PROCESSING SYSTEM, CONNECTION SERVER, PROCESSING SERVER, INFORMATION PROCESSING APPARATUS, INFORMATION PROCESSING METHOD AND PROGRAM

(75) Inventors: Kunio Gobara, Tokyo (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1271 days.

(21) Appl. No.: 11/908,612

(22) PCT Filed: Feb. 22, 2006

(86) PCT No.: PCT/JP2006/303115
§ 371 (c)(1),
(2), (4) Date: Sep. 14, 2007

(87) PCT Pub. No.: WO2006/098122
PCT Pub. Date: Sep. 21, 2006

(65) Prior Publication Data
US 2009/0013324 A1  Jan. 8, 2009

(30) Foreign Application Priority Data
Mar. 17, 2005  (JP) ................. 2005-076779

(51) Int. Cl.
*G06F 15/16* (2006.01)
*G06F 9/46* (2006.01)
(52) U.S. Cl.
USPC ............ 718/105; 709/227; 709/228; 709/223
(58) Field of Classification Search
USPC ....................................... 718/105
See application file for complete search history.

(56) References Cited

U.S. PATENT DOCUMENTS 6,112,222 A * 8/2000 Govindaraju et al. ........ 718/102
6,182,146 B1 * 1/2001 Graham-Cumming, Jr. . 709/238
(Continued)

FOREIGN PATENT DOCUMENTS

JP  9-293059  11/1997
JP  10-198642 A  7/1998
(Continued)

OTHER PUBLICATIONS

European Search Report for EP 06 71 4255.
(Continued)

*Primary Examiner* — Lewis A Bullock, Jr.
*Assistant Examiner* — Kevin X Lu
(74) *Attorney, Agent, or Firm* — Pearne & Gordon LLP

(57) ABSTRACT

A connection server (3) has a receiving part (31) for receiving request information regarding a request for load sharing, which is sent from a first information processing apparatus (1) to a load sharing port of the connection server (3), a load sharing part (32) for allocating the first information processing apparatus (1) that is a source of the request information to any processing server, a sending part (33) for sending port position information indicating the position of the connection port corresponding to the allocated processing server to the first information processing apparatus (1), and a connection part (34) for establishing a connection between the connection port and the processing server corresponding to the connection port. The first information processing apparatus (1) sends the received port position information to a second information processing apparatus (2). With this configuration, in a communication system for load sharing, two or more information processing apparatuses have access to one processing server.

11 Claims, 8 Drawing Sheets

(56) References Cited

U.S. PATENT DOCUMENTS

| | | | |
|---|---|---|---|
| 6,360,262 B1* | 3/2002 | Guenthner et al. | 709/226 |
| 6,567,377 B1 | 5/2003 | Vepa et al. | |
| 6,614,758 B2* | 9/2003 | Wong et al. | 370/232 |
| 6,625,648 B1* | 9/2003 | Schwaller et al. | 709/224 |
| 6,631,122 B1* | 10/2003 | Arunachalam et al. | 370/332 |
| 6,672,961 B1 | 1/2004 | Uzun | |
| 6,804,245 B2* | 10/2004 | Mitchem et al. | 370/395.31 |
| 6,875,110 B1* | 4/2005 | Crumby | 463/42 |
| 7,237,260 B2* | 6/2007 | Yu et al. | 726/11 |
| 7,328,280 B2* | 2/2008 | Takeda et al. | 709/245 |
| 7,406,526 B2* | 7/2008 | Benchetrit et al. | 709/228 |
| 7,426,574 B2* | 9/2008 | Liao | 709/238 |
| 7,860,096 B2* | 12/2010 | Johnsen et al. | 370/392 |
| 8,218,169 B2* | 7/2012 | Horiyama | 358/1.15 |
| 8,239,541 B2* | 8/2012 | Gobara et al. | 709/227 |
| 2002/0032773 A1* | 3/2002 | Jiang | 709/225 |
| 2002/0083199 A1* | 6/2002 | Dingsor et al. | 709/245 |
| 2002/0116497 A1* | 8/2002 | Tung | 709/227 |
| 2003/0105812 A1* | 6/2003 | Flowers et al. | 709/203 |
| 2003/0172164 A1* | 9/2003 | Coughlin | 709/227 |
| 2004/0260761 A1* | 12/2004 | Leaute et al. | 709/201 |
| 2004/0268357 A1* | 12/2004 | Joy et al. | 718/105 |
| 2006/0045098 A1* | 3/2006 | Krause | 370/396 |
| 2006/0080446 A1* | 4/2006 | Bahl | 709/227 |
| 2006/0168318 A1* | 7/2006 | Twiss | 709/238 |
| 2007/0016670 A1* | 1/2007 | Cooper | 709/224 |
| 2007/0291694 A1* | 12/2007 | Zhang | 370/331 |

FOREIGN PATENT DOCUMENTS

| | | |
|---|---|---|
| JP | 10-312365 | 11/1998 |
| JP | 2001-236293 | 8/2001 |
| JP | 2001-312487 | 11/2001 |
| JP | 2005-010983 A | 1/2005 |
| JP | 2006136030 A * | 5/2006 |
| WO | 2004/063843 A2 | 7/2004 |

OTHER PUBLICATIONS

Suguru Yasui, "Hajimete Manabu Linux Kernel Dai 15 Kai Network Kino (Tsuiho Hen)" Nikkei Linux, Nov. 8, 2004, vol. 6, No. 11, pp. 101 to 106.

International Search report dated Jun. 6, 2006.

* cited by examiner

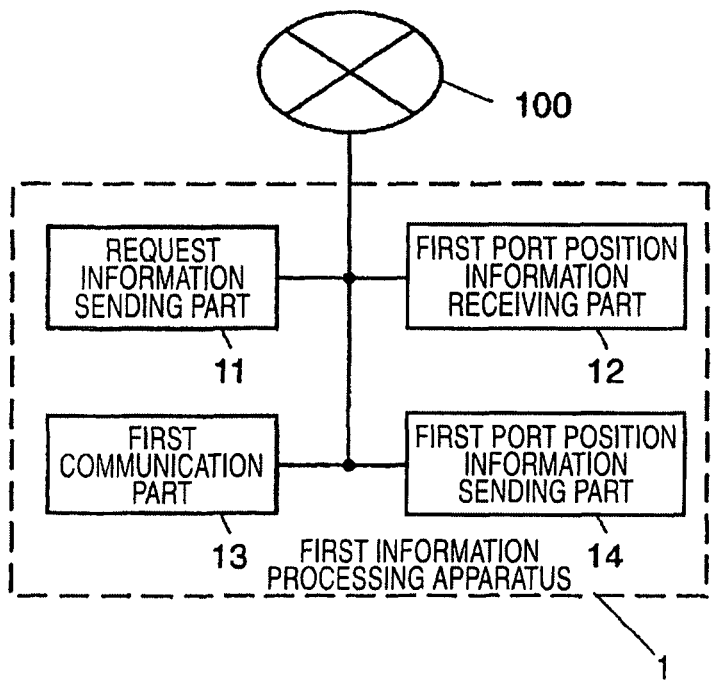
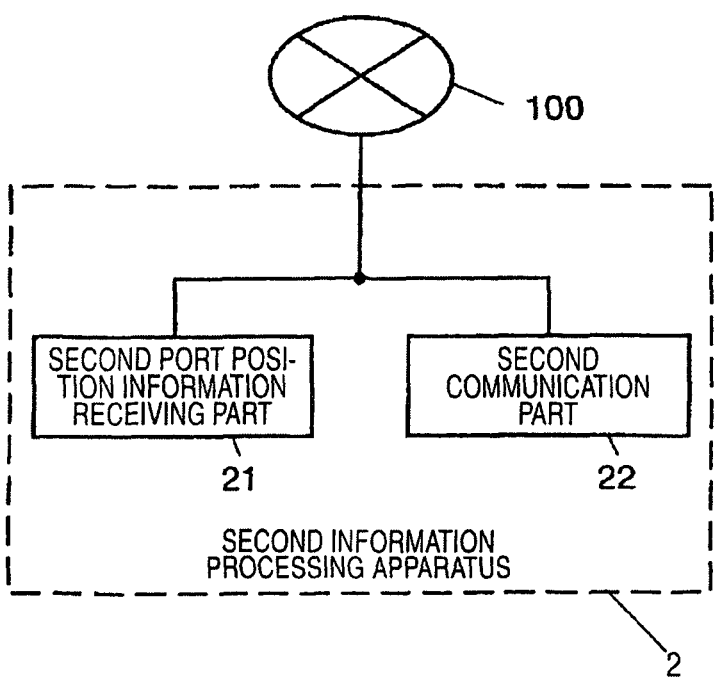

FIG. 8

| PROCESSING SERVER | PORT NUMBER OF CONNECTION PORT |
|---|---|
| PROCESSING SERVER 41 | 10001~10010 |
| PROCESSING SERVER 42 | 10011~10020 |
| PROCESSING SERVER 43 | 10021~10030 |
| PROCESSING SERVER 44 | 10031~10040 |
| PROCESSING SERVER 45 | 10041~10050 |

FIG. 9

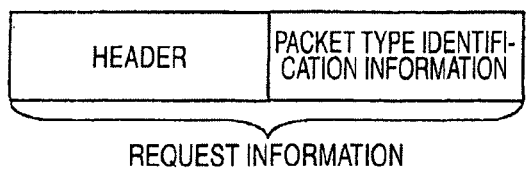

HEADER | PACKET TYPE IDENTIFICATION INFORMATION

⎫ REQUEST INFORMATION

FIG. 10

| PORT NUMBER OF CONNECTION PORT | ADDRESS OF PROCESSING SERVER OF DESTINATION | PORT NUMBER OF PROCESSING SERVER OF DESTINATION |
|---|---|---|
| 10001 | 192.168.0.11 | 20001 |
| 10002 | 192.168.0.11 | 20002 |
| 10003 | 192.168.0.11 | 20003 |
| ⋮ | ⋮ | ⋮ |
| 10011 | 192.168.0.12 | 20001 |
| 10012 | 192.168.0.12 | 20002 |
| ⋮ | ⋮ | ⋮ |
| 10021 | 192.168.0.13 | 20001 |
| 10022 | 192.168.0.13 | 20002 |
| ⋮ | ⋮ | ⋮ |

FIG. 15

| PROCESSING SERVER | ADDRESS |
|---|---|
| PROCESSING SERVER 61 | 192.168.0.11 |
| PROCESSING SERVER 62 | 192.168.0.12 |
| PROCESSING SERVER 63 | 192.168.0.13 |
| PROCESSING SERVER 64 | 192.168.0.14 |
| PROCESSING SERVER 65 | 192.168.0.15 |

COMMUNICATION SYSTEM, INFORMATION PROCESSING SYSTEM, CONNECTION SERVER, PROCESSING SERVER, INFORMATION PROCESSING APPARATUS, INFORMATION PROCESSING METHOD AND PROGRAM

TECHNICAL FIELD

The present invention relates to a communication system having a plurality of processing servers and a connection server.

BACKGROUND ART

As the conventional technique for realizing the stable system operation even if the load on a computer system is increased, a load sharing has been developed. Particularly, such load sharing is employed for a server in the computer system. On the other hand, there is a situation where previously inputted data may disappear depending on the processing contents, if a different server is allocated every time of access. Accordingly, there have been developed techniques called a session maintenance and a persistence process in which when the load sharing is made, access is continuously allocated to the same server, using the IP address or cookie (Cookie) of the source.

These technical contents were disclosed in non-patent document, Katsuji Yamashita, "Using the load sharing apparatus (1)", Nikkei Communication, Nikkei BP Company, 2003 Jun. 9, Vol. 392., p. 126-129.

However, even if the above technique of session maintenance as conventionally known was used, one information processing apparatus and the other information processing apparatus could not be allocated to the same server in the load sharing. Accordingly, when the peer-to-peer communication is established between two information processing apparatuses, for example, there was a problem that it is difficult for the two information processing apparatuses to exchange information between information processing apparatuses using the same server in the system for load sharing.

As a method for solving the problem, the information may be shared among a plurality of servers to which access is allocated by load sharing, in which there is another problem that a large load for sharing information is imposed on each server.

Also, there was a demand for lightening a process for session maintenance for use with the conventional technique for session maintenance.

SUMMARY OF THE INVENTION

Problems that the Invention is to Solve

This invention has been achieved to solve the above-mentioned problems, and it is an object of the invention to provide a communication system that can lighten a process for session maintenance in the load sharing.

Also, it is another object of the invention to enable access from a plurality of information processing apparatuses to one server in a communication system using the load sharing.

In order to accomplish the above object, the present invention provides an information processing system having N processing servers (N is an integer of 2 or greater) and a connection server for connecting an information processing apparatus and any one of the N processing servers, in which the connection ports that are a plurality of ports for the connection server correspond to the N processing servers for every one or more ports, wherein the connection server comprises a receiving part for receiving request information that is information regarding a request for load sharing, which is sent from the information processing apparatus to a load sharing port of the connection server, a load sharing part for allocating the information processing apparatus that is the source of the request information received by the receiving part to any of the N processing servers, a sending part for sending port position information that is information indicating the position of the connection port corresponding to the processing server allocated by the load sharing part to the information processing apparatus, and a connection part for establishing a connection between the connection port and the processing server corresponding to the connection port.

With this configuration, the load sharing is made, and two or more information processing apparatuses have access to the processing server allocated to one information processing apparatus by using the connection port indicated by the port position information. By appropriately making the connection with the connection part, the processing of the connection part is not increased even if the number of sessions between the information processing apparatus and the processing server is increased, whereby it is possible to make the session maintenance through the lighter process.

Also, the invention provides an information processing system having N processing servers (N is an integer of 2 or greater) and a connection server for connecting an information processing apparatus and any one of the N processing servers, in which the connection ports that are a plurality of ports for the connection server correspond to the N processing servers for every one or more ports, wherein the connection server comprises a first receiving part for receiving request information that is information regarding a request for load sharing, which is sent from the information processing apparatus to a load sharing port of the connection server, a load sharing part for allocating the information processing apparatus that is a source of the request information received by the first receiving part to any of the N processing servers, a first sending part for sending the request information to the processing server allocated by the load sharing part, a second receiving part for receiving port position information that is information indicating the position of the connection port corresponding to the processing server and sent from the processing server, a second sending part for sending the port position information received by the second receiving part to the information processing apparatus that is the source of the request information, and a connection part for establishing a connection between the connection port and the processing server corresponding to the connection port, and wherein each of the N processing servers comprises a port position information storage part for storing the port position information that is information indicating the position of one or more connection ports corresponding to the processing server, a request information receiving part for receiving the request information, and a port position information sending part for sending the port position information stored in the port position information storage part when the request information receiving part receives the request information.

With this configuration, the load sharing is made, and two or more information processing apparatuses have access to the processing server allocated to one information processing apparatus by using the connection port indicated by the port position information. By appropriately making the connection with the connection part, the processing of the connection part is not increased even if the number of sessions between the information processing apparatus and the processing server is increased, whereby it is possible to make the session maintenance through the lighter process. Also, since the sending process for the port position information is performed in the processing server, the processing load of the connection server can be lighter than the port position information is constructed and sent in the connection server.

Also, the invention provides a communication system comprising the information processing system and a first information processing apparatus, wherein the first information processing apparatus comprises a request information sending part for sending the request information to the load sharing port, a port position information receiving part for receiving the port position information, and a communication part for communicating with one processing server via a connection port indicated by the port position information received by the port position information receiving part.

With this configuration, the first information processing apparatus has access to the processing server allocated through the load sharing process via the connection port.

Also, the invention provides a communication system comprising the information processing system, a first information processing apparatus and a second information processing apparatus, wherein the first information processing apparatus comprises a request information sending part for sending the request information to the load sharing port, a first port position information receiving part for receiving the port position information, a first communication part for communicating with one processing server via a connection port indicated by the port position information received by the first port position information receiving part, and a first port position information sending part for sending the port position information received by the first port position information receiving part, and wherein the second information processing apparatus comprises a second port position information receiving part for receiving the port position information sent from the first information processing apparatus, and a second communication part for communicating with one processing server via a connection port indicated by the port position information received by the second port position information receiving part.

With this configuration, the first information processing apparatus and the second information processing apparatus have access to the same processing server via the connection port indicated by the port position information. Accordingly, two or more information processing apparatuses have access to the processing server allocated through the load sharing though the load sharing is made.

With the communication system according to the invention, plural information processing apparatuses have access to one processing server in the communication system for making the load sharing. Also, the process for session maintenance in the load sharing can be lightened by appropriately establishing the connection between the information processing apparatus and the processing server.

BRIEF DESCRIPTION OF THE DRAWINGS

FIG. 2 is a block diagram showing the configuration of a first information processing apparatus according to the embodiment 1 of the invention.

FIG. 3 is a block diagram showing the configuration of a second information processing apparatus according to the embodiment 1 of the invention.

FIG. 8 is a view showing one example of correspondence between the processing server and the connection port according to the embodiment 1 of the invention.

FIG. 9 is a view showing one example of the configuration of request information according to the embodiment 1 of the invention.

FIG. 10 is a view showing one example of a translation table according to the embodiment 1 of the invention.

FIG. 15 is a view showing one example of correspondence between the processing server and the address according to the embodiment 2 of the invention.

DESCRIPTION OF REFERENCE NUMERALS AND SIGNS

Figure 1:
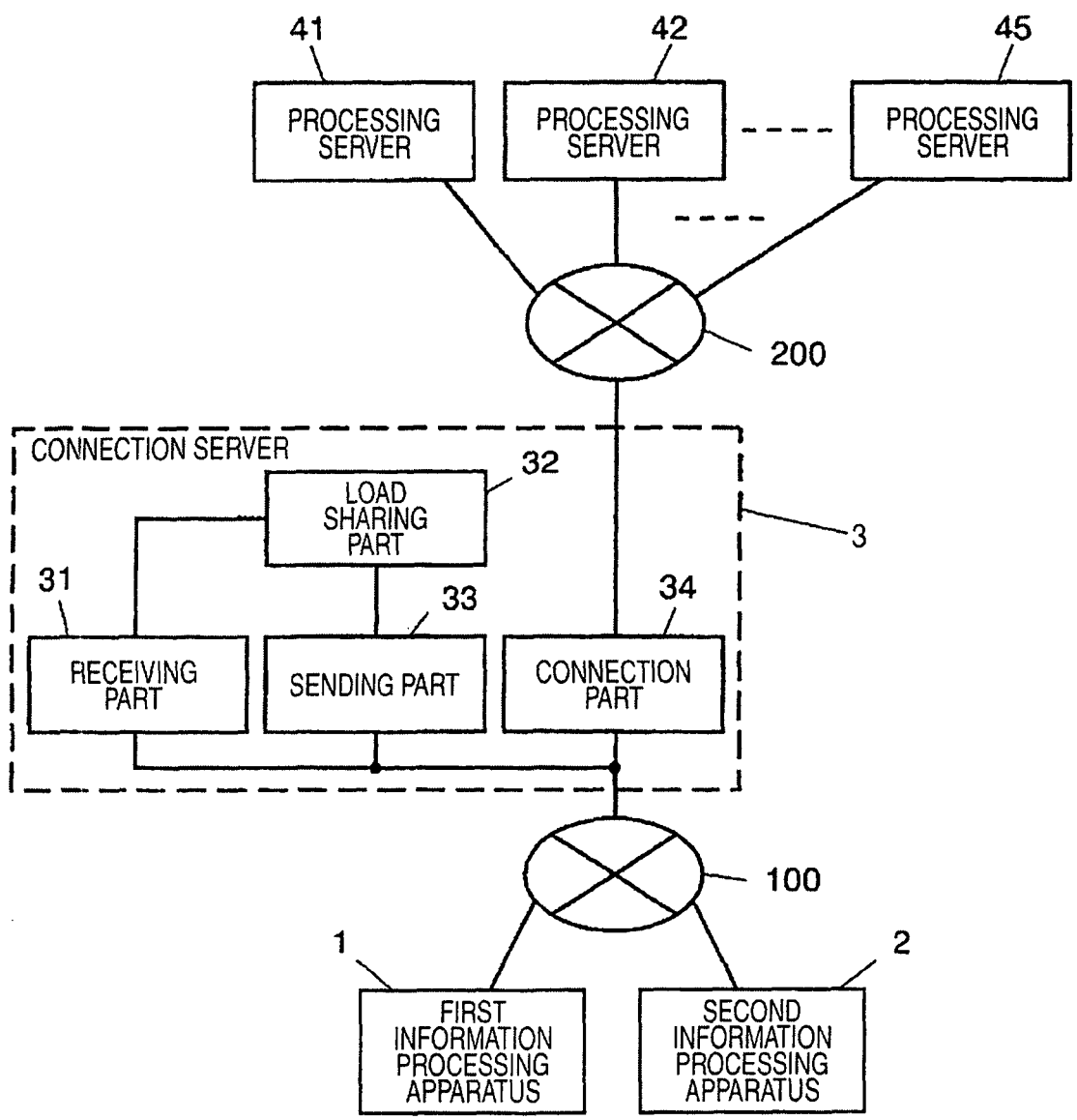
FIG. 1 is a diagram showing the configuration of an information processing system according to an embodiment 1 of the present invention.

1 first information processing apparatus
2 second information processing apparatus
3, 5 connection servers
41 to 45, 61 to 65 processing servers
11 request information sending part
12 first port position information receiving part
13 first communication part
14 first port position information sending part
21 second port position information receiving part
22 second communication part
31 receiving part
32, 52 load sharing parts
33 sending part
34 connection part
411 communication part
421 processing part
51 first receiving part
53 first sending part
54 second receiving part
55 second sending part
611 request information receiving part
621 port position information storage part
631 port position information sending part

BEST MODE FOR CARRYING OUT THE INVENTION

The embodiments of a communication system according to the present invention will be described below. In the following embodiments, the same or like parts and steps designated by the same reference numerals or signs are the same or equivalent, and are not described duplicately.

(Embodiment 1)

A communication system according to an embodiment 1 of the invention will be described below with reference to the drawings.

FIG. 1 is a diagram showing the configuration of the communication system according to this embodiment. In FIG. 1, the communication system according to the embodiment comprises a first information processing apparatus 1, a second information processing apparatus 2, a connection server 3, and five processing servers 41, 42, 43, 44 and 45. The first information processing apparatus 1, the second information processing apparatus 2 and the connection server 3 are interconnected via a wire or wireless communication circuit 100. Also, the connection server 3 and the five processing servers 41 to 45 are interconnected via a wire or wireless communication circuit 200. Herein, the communication circuit 100 may be internet, intranet, or a public telephone line network, for example. The communication circuit 200 is a LAN (Local Area Network), for example, but may be internet, intranet or public telephone line network.

The connection server 3 according to this embodiment connects the information processing apparatus and any one of the five processing servers 41 to 45, and comprises a receiving part 31, a load sharing part 32, a sending part 33 and a connection part 34.

The receiving part 31 receives request information transmitted from the first information processing apparatus 1 to a load sharing port of the connection server 3. Herein, the load sharing port is the port set to receive the request information on the side of the communication circuit 100 of the connection server 3. A single port or two or more ports may be provided. Also, the request information is information regarding a request for load sharing. The load sharing part 32 as hereinafter described performs a load sharing process, upon the receiving part 31 receiving this request information. This request information may or may not include a command for requesting the load sharing process. For example, the request information may be a packet transmitted from the first information processing apparatus 1 to the load sharing port without information contained in the payload. Also, the request information may include the identification information designating the request information. The receiving part 31 may include a receiving device (e.g., a modem or a network card) for making the reception, or may not include it (in this case, the receiving device, not shown, exists between the receiving part 31 and the communication circuit 100). Also, the receiving part 31 may be realized by hardware, or by software such as a driver for driving the receiving device.

The load sharing part 32 allocates the information processing apparatus that is a source of the request information received by the receiving part 31 to any of the five processing servers 41 to 45. Herein, allocating the information processing apparatus to any processing server means specifying the processing server in charge of performing a series of processes requested by the information processing apparatus. A method for this load sharing part 32 allocating the information processing apparatus does not matter. This method may be a round robin for allows plural processing servers to be allocated evenly, a ratio mode for allowing plural processing servers to be allocated at preset ratio, a priority level mode for allowing the processing servers to be grouped and allocated according to the value of priority designated for each processing server group, a least connection mode for allocating the information processing apparatus to the processing server with the least number of connections, a top speed mode for allocating the information processing apparatus to the processing server that responds fastest, a supervisory mode for supervising the number of connections and the response speed of the processing server to make the allocation in accordance with a predetermined algorithm, a prediction mode for supervising the number of connections and the response speed of the processing server and predicting the performance of each processing server to make the allocation, or other methods, for example. These methods are well known, and not described here. Also, for example, when the processing server to be allocated is decided depending on the number of connections or the response speed of the processing server, the connection server 3 may have a measuring part, not shown, for measuring the number of connections or the response speed, or receive the number of connections or the response speed measured by other instruments, regardless of a path via which the load sharing part 32 acquires the number of connections or the response speed.

The sending part 33 sends the port position information to the information processing apparatus that transmits the request information. Herein, the port position information is information indicating the position of connection port corresponding to the processing server allocated by the load sharing part 32. The connection ports that are plural ports on the side of the communication circuit 100 of the connection server 3 correspond to the five processing servers 41 to 45 for every one or more ports. For example, the connection port P1 and the connection port P2 correspond to the processing server 41, the connection port P3 corresponds to the processing server 42, and the connection port P4 and the connection port P5 correspond to the processing server 43. The information indicating the position of connection port included in the port position information may be the port number of connection port, for example. The sending part 33 may include a sending device (e.g., a modem or a network card) for making the sending, or may not include it (in this case the sending device, not shown, exists between the sending part 33 and the communication circuit 100). Also, the sending part 33 may be realized by hardware, or by software such as a driver for driving the sending device.

The connection part 34 makes the connection between the connection port and the processing server corresponding to the connection port. That is, the information transmitted from the information processing apparatus to a certain connection port is sent to the processing server corresponding to the connection port. Also, the information sent from the processing server is sent to the information processing apparatus that makes a request for processing to the processing server. The connection part 34 may include a communication device (e.g., a modem or a network card) for making the communication, or may not include it (in this case, the communication device, not shown, exists between the connection part 34 and the communication circuit 100 or the communication circuit 200). Also, the connection part 34 may be realized by hardware, or by software such as a driver for driving the communication device.

In the case where any two or more components of the receiving part 31, the sending part 33 and the connection part 34 have devices for communication, they may be the same means or separate means.

FIG. 2 is a block diagram showing the configuration of the first information processing apparatus 1 according to this embodiment. In FIG. 2, the first information processing apparatus 1 according to this embodiment comprises a request information sending part 11, a first port position information receiving part 12, a first communication part 13, and a first port position information sending part 14. The first information processing apparatus 1 may be a computer, a microwave oven, a telephone set, a printer, a facsimile apparatus, a refrigerator, a washing machine, an air conditioner, a television, a video recorder, or a set top box, for example, and take any form as far as it has the following components.

The request information sending part 11 sends the request information to the load sharing port of the connection server 3. The request information sending part 11 may include a sending device (e.g., a modem or a network card) for making the sending, or may not include it (in this case, the sending device, not shown, exists between the request information sending part 11 and the communication circuit 100). Also, the request information sending part 11 may be realized by hardware, or by software such as a driver for driving the sending device.

The first port position information receiving part 12 receives port position information sent from the connection server 3. The first port position information receiving part 12 may include a receiving device (e.g., a modem or a network card) for making the reception, or may not include it (in this case, the receiving device, not shown, exists between the first port position information receiving part 12 and the communication circuit 100). Also, the first port position information receiving part 12 may be realized by hardware, or by software such as a driver for driving the receiving device.

The first communication part 13 communicates with one processing server via the connection port indicated by the port position information received by the first port position information receiving part 12. The one processing server is the processing server allocated by the load sharing part 32. The first communication part 13 may include a communication device (e.g., a modem or a network card) for making the communication, or may not include it (in this case, the communication device, not shown, exists between the first communication part 13 and the communication circuit 100). Also, the first communication part 13 may be realized by hardware, or by software such as a driver for driving the communication device.

The first port position information sending part 14 sends the port position information received by the first port position information receiving part 12 to the second information processing apparatus 2. Herein, the first port position information sending part 14 may send the port position information to the second information processing apparatus 2 via a predetermined server, send the port position information to the second information processing apparatus 2 through the peer-to-peer communication, or send the port position information to the second information processing apparatus 2 by any other sending method. The method for sending the port position information via the predetermined server may be a well known relay server such as an SIP (Session Initiation Protocol) or H.323, for example, and the description for sending is omitted. Also, the peer-to-peer communication is already well known, and its description is omitted. The first port position information sending part 14 may include a sending device (e.g., a modem or a network card) for making the sending, or may not include it (in this case, the sending device, not shown, exists between the first port position information sending part 14 and the communication circuit 100). Also, the first port position information sending part 14 may be realized by hardware, or by software such as a driver for driving the sending device.

In the case where any two or more components of the request information sending part 11, the first port position information receiving part 12, the first communication part 13, and the first port position information sending part 14 have devices for communication, they may be the same means or separate means.

FIG. 3 is a block diagram showing the configuration of the second information processing apparatus 2 according to this embodiment. In FIG. 3, the second information processing apparatus 2 according to this embodiment comprises a second port position information receiving part 21 and a second communication part 22. The second information processing apparatus 2 may be a computer, a microwave oven, a telephone set, a printer, a facsimile apparatus, a refrigerator, a washing machine, an air conditioner, a television, a video recorder, or a set top box, for example, and take any form as far as it has the following components.

The second port position information receiving part 21 receives port position information transmitted from the first information processing apparatus 1. This port position information may be directly transmitted from the first information processing apparatus 1, or transmitted via a predetermined server. The second port position information receiving part 21 may include a receiving device (e.g., a modem or a network card) for making the reception, or may not include it (in this case, the receiving device, not shown, exists between the second port position information receiving part 21 and the communication circuit 100). Also, the second port position information receiving part 21 may be realized by hardware, or by software such as a driver for driving the receiving device.

The second communication part 22 communicates with one processing server via the connection port indicated by the port position information received by the second port position information receiving part 21. Since the processing server with which the second communication part 22 communicates is also the processing server with which the first communication part 13 of the first information processing apparatus 1 communicates, the first communication part 13 and the second communication part 22 can perform some process, for example, a process for establishing the peer-to-peer communication, or an interactive online game process via the processing server.

In the case where the second port position information receiving part 21 and the second communication part 22 have devices for communication, they may be the same means or separate means.

Figure 4:
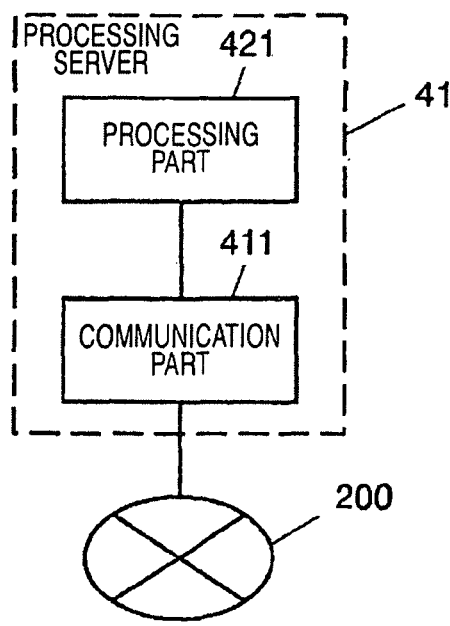
FIG. 4 is a block diagram showing the configuration of a processing server according to the embodiment 1 of the invention.

FIG. 4 is a block diagram showing the configuration of the processing server 41 according to this embodiment. In FIG. 4, the processing server 41 according to this embodiment comprises a communication part 411 and a processing part 421.

The communication part 411 communicates with the connection server 3. The communication part 411 may include a communication device (e.g., a modem or a network card) for making the communication, or may not include it (in this case, the communication device, not shown, exists between the communication part 411 and the communication circuit 200). Also, the communication part 411 may be realized by hardware, or by software such as a driver for driving the communication device.

The processing part 421 performs a process according to a processing request transmitted from the information processing apparatus. For example, in the case where the processing server 41 is a web server, it may perform a process for sending an HTTP response to an HTTP request transmitted from the information processing apparatus. Also, in the case where the processing server 41 is a server that makes a process for establishing the peer-to-peer communication between the first information processing apparatus 1 and the second information processing apparatus 2, it relays the information between the first information processing apparatus 1 and the second information processing apparatus 2, or exchanges the information between the first information processing apparatus 1 and the second information processing apparatus 2. The processing contents of the processing part 421 are different depending on the function of the processing server 41.

Similarly, the other processing server 4N comprises a communication part 41N and a processing part 42N. Where "N" is any integer from 2 to 5.

Referring to a flowchart of FIG. 5, the operation of the connection server 3 according to this embodiment will be described below.

(Step S101) It is judged whether or not the receiving part 31 receives request information transmitted to the load sharing port. And if the request information is received, the operation goes to step S102, or if not, the operation goes to step S104.

(Step S102) The load sharing part 32 allocates the information processing apparatus that transmits the request information received at step S101 to any one of the five processing servers 41 to 45.

(Step S103) The sending part 33 sends the port position information indicating the position of connection port corresponding to the processing server allocated at step S102 to the information processing apparatus that transmits the request information received at step S101. And the operation returns to step S101.

(Step S104) It is judged whether or not the connection part 34 receives information of processing request transmitted from the information processing apparatus to the connection port. And if the information of processing request is received, the operation goes to step S105, or if not, the operation goes to step S106.

(Step S105) The connection part 34 sends the information regarding the processing request received at step S104 to the processing server corresponding to the connection port that receives the information regarding the processing request. And the operation returns to step S101.

(Step S106) It is judged whether or not the connection part 34 receives information of processing result according to the processing request from any of the processing servers 41 to 45. And if the information of processing result is received, the operation goes to step S107, or if not, the operation returns to step S101.

(Step S107) The connection part 34 sends the information of processing result received at step S106 to the information processing apparatus that is destination to send the information. And the operation returns to step S101.

Figure 5:
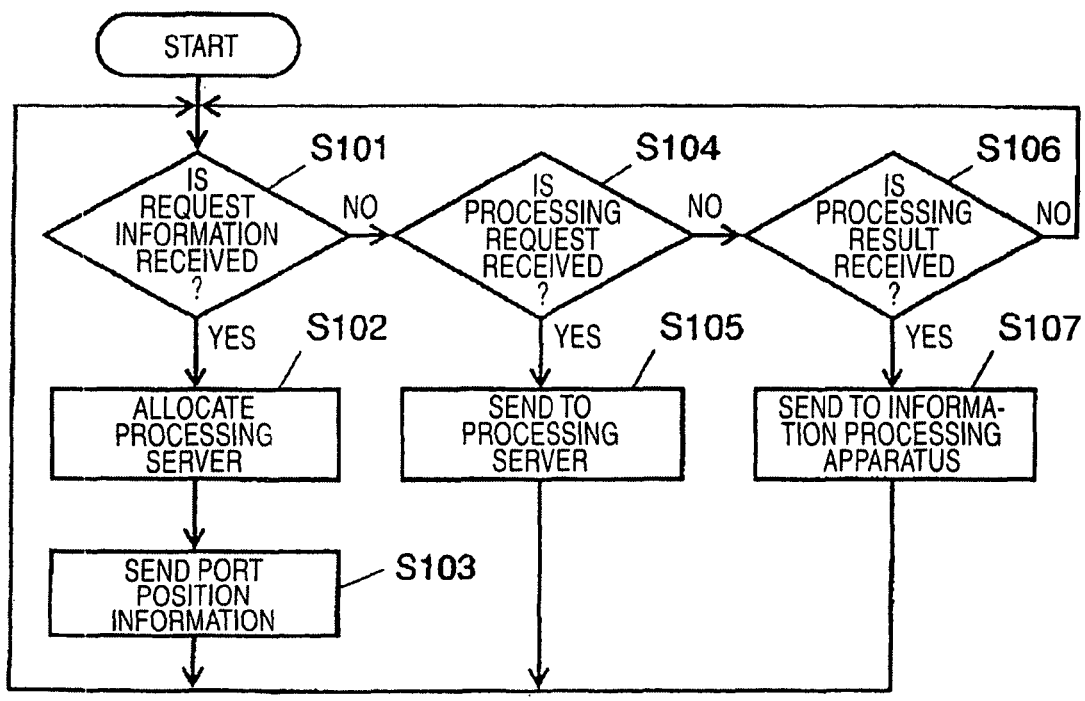
FIG. 5 is a flowchart showing the operation of a connection server according to the embodiment 1 of the invention.

In the flowchart of FIG. 5, the process is ended due to an interruption of power off or processing end.

Referring to a flowchart of FIG. 6, the operation of the first information processing apparatus 1 according to this embodiment will be described below.

(Step S201) It is judged whether or not the request information sending part 11 sends request information. And if the request information is sent, the operation goes to step S202, or if not, the processing at step S201 is repeated until it is judged that the request information is sent. It may be judged that the request information sending part 11 sends the request information with a predetermined event as a trigger, or at an appropriate timing, for example. As the predetermined event, for example, the user presses a button of the first information processing apparatus 1, an application program executed by the processing part, not shown, in the first information processing apparatus 1 requires the processing in the processing server and an instruction of sending the request information is passed to the request information sending part 11, or any other event.

(Step S202) The request information sending part 11 sends the request information to the load sharing port of the connection server 3. The address of the connection server 3 and the position of the load sharing port may be preset in the request information sending part 11, or received from the other component by the request information sending part 11 at the time of sending the request information.

(Step S203) It is judged whether or not the first port position information receiving part 12 receives the port position information. And if the port position information is received, the operation goes to step S204, or if not, a processing at step S203 is repeated until the port position information is received.

(Step S204) The first port position information sending part 14 sends the port position information received by the first port position information receiving part 12 to the second information processing apparatus 2.

(Step S205) The first communication part 13 makes the communication with the processing server via the connection port indicated by the port position information received by the first port position information receiving part 12. If the communication with the processing server is ended, the operation returns to step S201.

Figure 6:
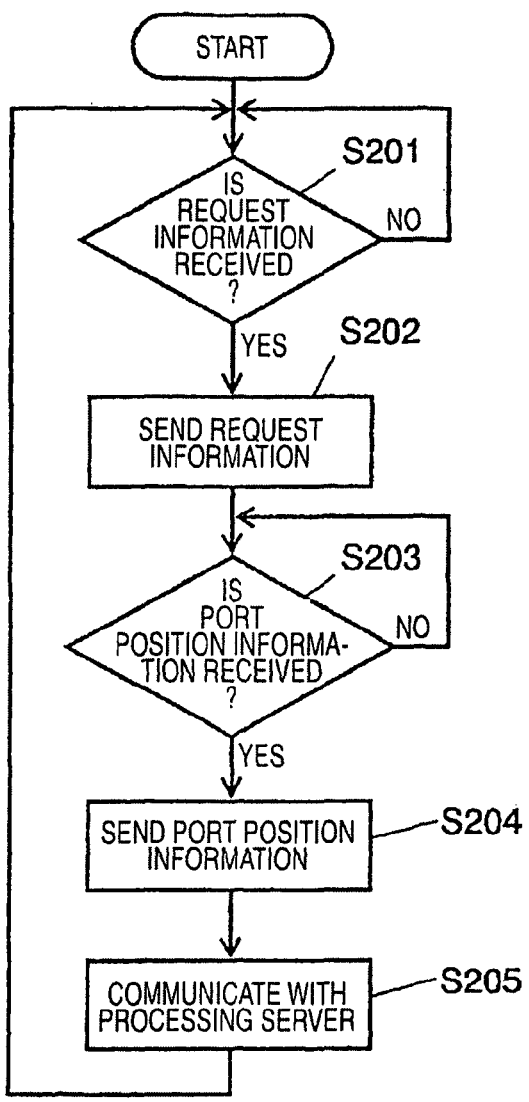
FIG. 6 is a flowchart showing the operation of the first information processing apparatus according to the embodiment 1 of the invention.

In the flowchart of FIG. 6, the process is ended due to an interruption of power off or processing end. Also, the first information processing apparatus 1 may perform any other process than the process as shown in FIG. 6. For example, when a peer-to-peer communication with the second information processing apparatus 2 is established in the communication with the processing server at step S205, a communication process with the second information processing apparatus 2 may be performed through the peer-to-peer communication.

Referring to a flowchart of FIG. 7, the operation of the second information processing apparatus 2 according to this embodiment will be described below.

(Step S301) It is judged whether or not the second port position information receiving part 21 receives the port position information. And if the port position information is received, the operation goes to step S302, or if not, a processing at step S301 is repeated until the port position information is received.

(Step S302) The second communication part 22 makes the communication with the processing server via the connection port indicated by the port position information received by the second port position information receiving part 21. This processing server is the same processing server which the first information processing apparatus 1 makes the communication with. If the communication with the processing server is ended, the operation returns to step S301.

Figure 7:
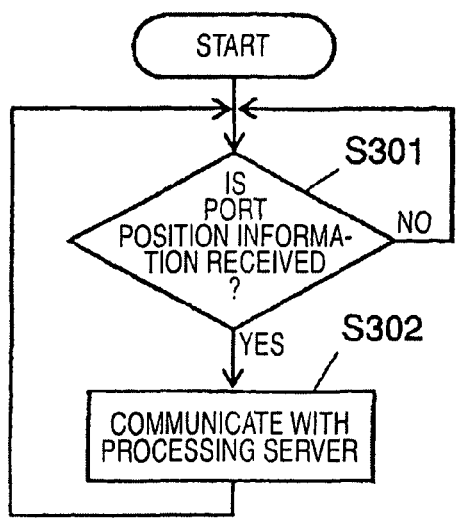
FIG. 7 is a flowchart showing the operation of the second information processing apparatus according to the embodiment 1 of the invention.

In the flowchart of FIG. 7, the process is ended due to an interruption of power off or processing end. Also, the second information processing apparatus 2 may perform any other process than the process as shown in FIG. 7. For example, when a peer-to-peer communication with the first information processing apparatus 1 is established in the communication with the processing server at step S302, a communication process with the first information processing apparatus 1 may be performed through the peer-to-peer communication.

Next, the operation of the communication system according to this embodiment will be described below using a specific example. In this specific example, the IP addresses of each apparatus and each server are as follows.

First information processing apparatus 1: 155.32.10.10
Second information processing apparatus 2: 202.132.10.6
Connection server 3 (on the side of communication circuit 100): 202.224.135.10

Connection server 3 (on the side of communication circuit 200): 192.168.0.1
    Processing server 41: 192.168.0.11
    Processing server 42: 192.168.0.12
    Processing server 43: 192.168.0.13
    Processing server 44: 192.168.0.14
    Processing server 45: 192.168.0.15

Also, the port number of the load sharing port is "9500", and the port number of the connection port is from "10001" to "10050". Also, the correspondence between the processing servers 41 to 45 and the connection port is shown in FIG. 8. For example, the processing server 41 corresponds to the connection port from port number 10001 to 10010. In the following description, for example, the port of port number 10001 is often called the port 10001.

Also, the processing servers 41 to 45 are servers for performing the process regarding an interactive online game performed between the first information processing apparatus 1 and the second information processing apparatus 2.

First of all, the request information sending part 11 of the first information processing apparatus 1 constructs a packet of request information in accordance with an instruction from the user, and sends the packet of request information to the preset IP address "202.224.135.10" and load sharing port "9500" of the connection server 3 (steps S201 and S202). It is assumed that the packet of request information is transmitted from the port 12345 of the first information processing apparatus 1. It is also assumed that the packet type identification information indicating the packet of request information is included in the payload of the packet of request information, as shown in FIG. 9.

The packet of request information is received by the receiving part 31 (step S101). The load sharing part 32 allocates the processing server upon receiving the packet of request information. Herein, it is assumed that the load sharing part 32 allocates the processing server 41 by round robin (step S102). The load processing part 32 passes an indication of allocating the processing server 41 to the sending part 33.

It is assumed that the connection server 3 has a table as shown in FIG. 8. Then, the sending part 33 constructs a packet of port position information indicating the port number "10003" of one connection port 10003 selected randomly from among the connection ports 10001 to 10010 corresponding to the processing server 41 by referring to the table, and sends the packet of port position information to the source of the packet of request information received by the receiving part 31 (step S103). The address "155.32.10.10" and the port number "12345" of the source of the packet of request information can be acquired from the header of the packet of request information.

The packet of port position information is received by the first port position information receiving part 12 of the first information processing apparatus 1 (step S203). And the received port position information is sent from the first port position information sending part 14 to the second information processing apparatus 2 (step S204). This sending is made via an SIP server, not shown, connected to the communication circuit 100. The first information processing apparatus 1 and the second information processing apparatus 2 register the apparatus identification information that is information for identifying. the apparatus, and the IP address and port number, in the SIP server, using a register function of the SIP server. And the sending of the port position information from the first information processing apparatus 1 to the second information processing apparatus 2 is made using a proxy function of the SIP server. A process for relaying the information via the SIP server is already well known, and is not described here. Also, the port position information to be sent from the first information processing apparatus 1 to the second information processing apparatus 2 may be sent via two or more servers, for example, two or more SIP (SIP proxy) servers.

It is assumed that the first communication part 13 sends a packet of processing request regarding the interactive online game to the port number "10003" included in the port position information received by the first port position information receiving part 12. Herein, the destination address of the packet of processing request is the address "202.224.135.10" on the side of the communication circuit 100 in the connection server 3. Also, it is assumed that the packet of processing request is sent from the port 12345 of the first information processing apparatus 1.

The connection part 34 has a translation table for the connection between the information processing apparatus and the processing server as shown in FIG. 10. In this translation table, the port number of connection port, the IP address of the processing server of destination and the port number of the processing server of destination are associated. In receiving a packet sent to the certain connection port, the connection part 34 changes the IP address and port number of destination included in the header of the packet to the IP address and port number of the processing server corresponding to the connection port in the translation table of FIG. 10 and sends the packet. In this case, the connection part 34 does not change the IP address and port number of source included in the header of the packet. On the other hand, in receiving a packet sent from the processing server, the connection part 34 converts the IP address and port number of the source of the packet to the IP address "202.224.135.10" on the side of the communication circuit 100 in the connection server 3 and the port number of the connection port associated with the port of the processing server in the translation table of FIG. 10 and sends the packet.

Specifically, in receiving the packet of processing request transmitted from the first information processing apparatus 1 to the connection port 10003 (step S104), the connection part 34 converts the IP address and port number of destination of the packet of processing request to the IP address "192.168.0.11" and post number "20003" of the processing server corresponding to the port number "10003" of the connection port by referring to the translation table of FIG. 10 and sends the packet (step S105). The packet is received at the port 20003 of the processing server 41. And the processing part 421 of the processing server 41 performs the processing in accordance with the processing request included in the packet of processing request, and sends a packet of processing request including the processing result to the IP address "155.32.10.10" and port number "12345" of the source of the packet of processing request.

The packet of processing result is received by the connection part 34 (step S106), and the IP address "192.168.0.11" and port number "20003" of source included in the header of the packet are converted into the IP address "202.224.135.10" on the side of the communication circuit 100 in the connection server 3 and the port number "10003" of the connection port corresponding to the IP address "192.168.0.11" and port number "20003" of source in accordance with the translation table of FIG. 10 and sent to the first information processing apparatus 1 (step S107). In this case, the IP address and port number of destination included in the packet of processing result are not converted.

The packet of processing result is received by the first communication part 13 of the first information processing apparatus 1. In this manner, the communication between the first information processing apparatus 1 and the processing server 41 is made (step S205).

The port position information transmitted from the first information processing apparatus 1 to the second information processing apparatus 2 via the SIP server, not shown, is received by the second port position information receiving part 21 of the second information processing apparatus 2 (step S301). And the communication is also made via the connection part 34 between the second communication part 22 of the second information processing apparatus 2 and the processing server 41 in the same manner as above described (step S302). The communication is also made via the connection port 10003. In this manner, the first information processing apparatus 1 and the second information processing apparatus 2 can make the interactive online game using the processing server 41.

Though the interactive online game is performed using the processing server in this specific example, other processes may be made using the processing server. For example, a process for establishing the peer-to-peer communication between the first information processing apparatus 1 and the second information processing apparatus 2 may be made, or the data relay of moving picture data, voice data or application software data may be made. Also, after the first information processing apparatus 1 and the second information processing apparatus 2 make access to the same processing server, the first information processing apparatus 1 and the second information processing apparatus 2 may make the communication via the processing server. Or each of the first information processing apparatus 1 and the second information processing apparatus 2 may make some processing with the processing server.

As described above, with the communication system according to this embodiment, the load sharing is made in the connection server 3, and the information processing apparatus and the processing server are connected via the connection port corresponding to the processing server allocated by the load sharing, whereby the information processing apparatus other than the information processing apparatus making the request for load sharing have access to the same processing server via the connection port as the information processing apparatus making the request for load sharing.

In this manner, since two or more information processing apparatuses have access to the same processing server, the processing load on plural processing servers can be reduced. For example, if the first information processing apparatus 1 gains access to the processing server 41, and the second information processing apparatus 2 gains access to the processing server 42, a process for passing data from the processing server 41 to the processing server 42 is required in making the data relay from the first information processing apparatus 1 to the second information processing apparatus 2 via the processing servers, whereby the processing load on the processing server is further increased. On the other hand, supposing that each of the first information processing apparatus 1 and the second information processing apparatus 2 gains access to the processing server 41, the data relay from the first information processing apparatus 1 to the second information processing apparatus 2 can be made via only the processing server 41, whereby a process for passing data from one processing server to another can be dispensed with, so that the processing load on the processing servers 41 and 42 is reduced.

Also, the connection part 34 can connect the information processing apparatus and the processing server in accordance with the table having predetermined records for associating the connection port and the processing server, as shown in the translation table of FIG. 10 in the above specific example. In the process for session maintenance using the IP address in the conventional example, the number of records in the translation table for use to connect the information processing apparatus and the processing server was proportional to the number of sessions that are maintained. Accordingly, if the number of sessions is increased, the number of records in the translation table is greater, so that the connection load between the information processing apparatus and the processing server is greater. On the contrary, the process in the connection part 34 as described in the above specific example is made using the same translation table, regardless of the number of sessions, whereby the process in the connection part 34 can be lighter than the conventional example.

In this embodiment, in the case where two or more connection ports correspond to the processing server, the sending part 33 selects one connection port from among the two or more connection ports, and sends the port position information indicating the position of the connection port as one example. However, the connection port may be selected by other than the sending part 33. For example, a process for selecting one connection port from among two or more connection ports may be made by the load sharing part 32. Also, in the case where two or more connection ports correspond to the processing server, for example, the sending part 33 may send the port position information indicating the positions of the two or more connection ports to the information processing apparatus, and select one connection port from among the two or more connection ports in the information processing apparatus.

While in this embodiment the information processing apparatus and the processing server are connected using the table as shown in FIG. 10, the connection part 34 may connect the information processing apparatus and the processing server using information that is not in the table format. That is, the connection part 34 may connect the information processing apparatus and the processing server using the predetermined correspondent information for associating the connection port and the processing server.

(Embodiment 2)

A communication system according to an embodiment 2 of the invention will be described below with reference to the drawings. The communication system according to this embodiment sends the port position information from each processing server.

Figure 11:
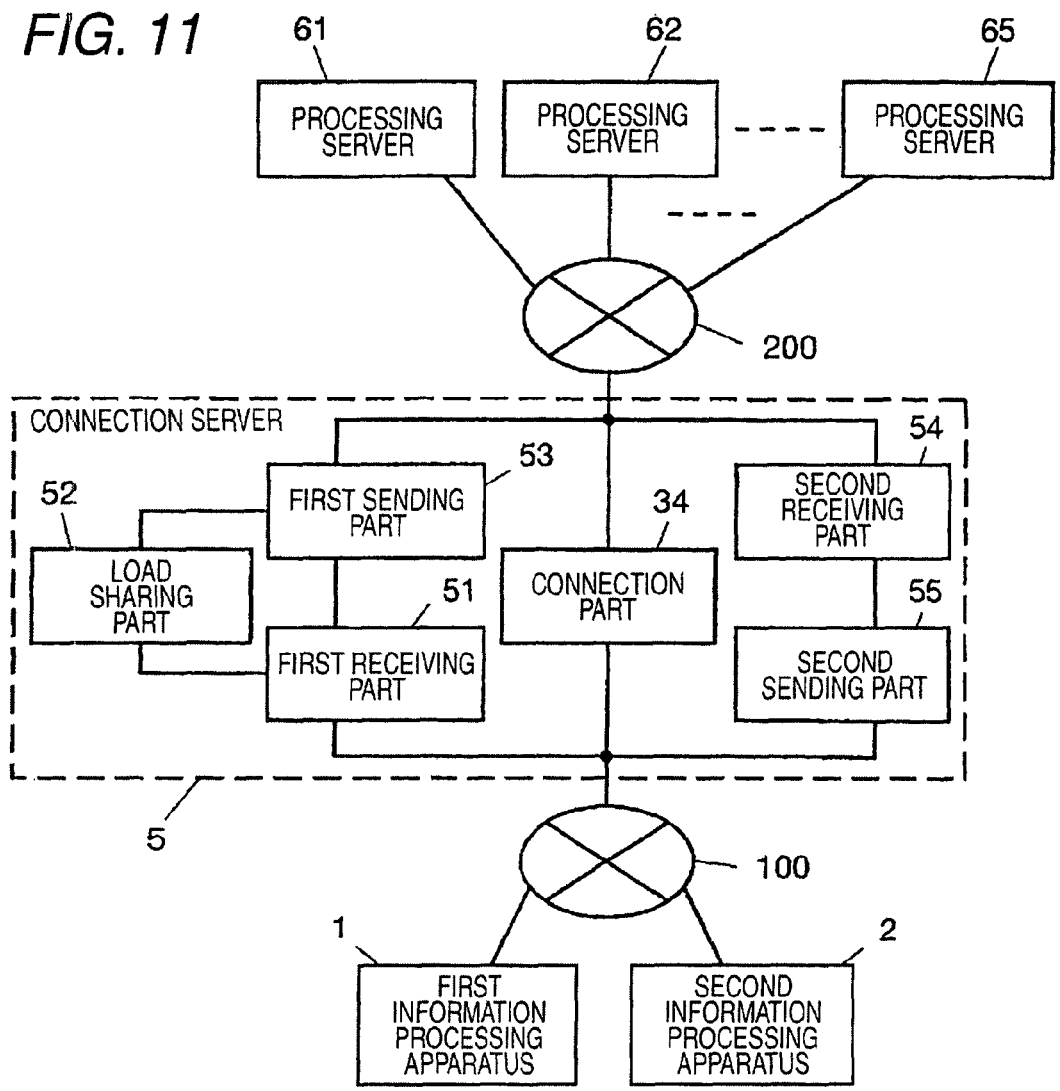
FIG. 11 is a diagram showing the configuration of an information processing system according to an embodiment 2 of the invention.

FIG. 11 is a diagram showing the configuration of the communication system according to this embodiment. In FIG. 11, the communication system according to the embodiment comprises a first information processing apparatus 1, a second information processing apparatus 2, a connection server 5, and five processing servers 61, 62, 63, 64 and 65. The configuration of the communication system other than the connection server 5 and the five processing servers 61 to 65 is the same as in the embodiment 1, and not described here.

The connection server 5 according to this embodiment connects the information processing apparatus and any one of the five processing servers 61 to 65, and comprises a connection part 34, a first receiving part 51, a load sharing part 52, a first sending part 53, a second receiving part 54 and a second sending part 55. The configuration and operation of the connection part 34 are the same as in the embodiment 1, and not described here.

The first receiving part 51 receives request information transmitted from the information processing apparatus to a load sharing port of the connection server 5. Herein, the request information is the same as in the embodiment 1. The first receiving part 51 may include a receiving device (e.g., a modem or a network card) for making the reception, or may not include it (in this case, the receiving device, not shown, exists between the receiving part 51 and the communication circuit 100). Also, the first receiving part 51 may be realized by hardware, or by software such as a driver for driving the receiving device.

The load sharing part 52, like the load sharing part 32 of the embodiment 1, allocates the information processing apparatus that is a source of the request information received by the first receiving part 51 to any of the five processing servers 61 to 65.

The first sending part 53 sends the request information received by the first receiving part 51 to the processing server allocated by the load sharing part 52. The first sending part 53 may include a sending device (e.g., a modem or a network card) for making the sending, or may not include it (in this case, the sending device, not shown, exists between the first sending part 53 and the communication circuit 200). Also, the first sending part 53 may be realized by hardware, or by software such as a driver for driving the sending device.

The second receiving part 54 receives the port position information sent from the processing server. Herein, the port position information is information indicating the position of connection port as in the embodiment 1. The connection port indicated by this port position information is the connection port corresponding to the processing server that sends the post position information. The second receiving part 54 may include a receiving device (e.g., a modem or a network card) for making the reception, or may not include it (in this case, the receiving device, not shown, exists between the second receiving part 54 and the communication circuit 200). Also, the second receiving part 54 may be realized by hardware, or by software such as a driver for driving the receiving device.

The second sending part 55 sends the port position information received by the second receiving part 54 to the information processing apparatus that is the source of the request information. The second sending part 55 may include a sending device (e.g., a modem or a network card) for making the sending, or may not include it (in this case, the sending device, not shown, exists between the second sending part 55 and the communication circuit 100). Also, the second sending part 55 may be realized by hardware, or by software such as a driver for driving the sending device.

In the case where any two or more components of the connection part 34, the first receiving part 51 and the second sending part 55 have devices for communication, they may be the same means or separate means.

Also, in the case where any two or more components of the connection part 34, the first sending part 53 and the second receiving part 54 have devices for communication, they may be the same means or separate means.

Figure 12:
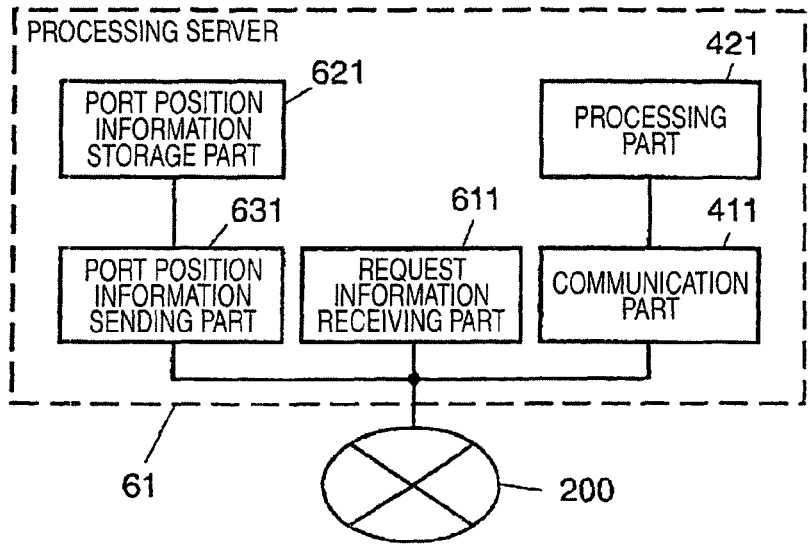
FIG. 12 is a block diagram showing the configuration of a processing server according to the embodiment 2 of the invention.

FIG. 12 is a block diagram showing the configuration of the processing server 61 according to this embodiment. In FIG. 12, the processing server 61 according to this embodiment comprises a communication part 411, a processing part 421, a request information receiving part 611, a port position information storage part 621, and a port position information sending part 631. The configuration and operation of the communication part 411 and the processing part 421 are the same as in the embodiment 1, and not described here.

The request information receiving part 611 receives the request information sent from the connection server 3. The request information receiving part 611 may include a receiving device (e.g., a modem or a network card) for making the reception, or may not include it (in this case, the receiving device, not shown, exists between the request information receiving part 611 and the communication circuit 200). Also, the request information receiving part 611 may be realized by hardware, or by software such as a driver for driving the receiving device.

The port position information storage part 621 stores the port position information. Herein, the port position information stored in the port position information storage part 621 is information indicating the position of one or more connection ports corresponding to the processing server 61. The port position information storage part 621 is realized by a predetermined recording medium (e.g., a semiconductor memory, a magnetic disk or an optical disk). The port position information storage part 621 may or may not temporarily store the port position information. In the former case, the port position information storage part 621 may be a buffer memory or the like that acquires and temporarily stores the port position information held in a predetermined server or the like.

The port position information sending part 631 sends the port position information stored in the port position information storage part 621 to the connection server 5, when the request information receiving part 611 receives the request information. In the case where the port position information storage part 621 stores the port position information indicating the position of two or more ports, the port position information sending part 631 may send the port position information indicating the position of all the two or more ports, or select one port from among the two or more ports and send the port position information indicating the position of the selected port. In the embodiment, the latter case will be described below. The port position information sending part 631 may include a sending device (e.g., a modem or a network card) for making the sending, or may not include it (in this case, the sending device, not shown, exists between the port position information sending part 631 and the communication circuit 200). Also, the port position information sending part 631 may be realized by hardware, or by software such as a driver for driving the sending device.

In the case where any two or more components of the communication part 411, the request information receiving part 611 and the port position information sending part 631 have devices for communication, they may be the same means or separate means.

Similarly, it is assumed that the other processing server 6N comprises a communication part 41N, a processing part 42N, a request information receiving part 61N, a port position information storage part 62N, and a port position information sending part 63N. Where "N" is any integer from 2 to 5. Also, the port position information stored in the port position information storage part 62N is information indicating the position of one or more connection ports corresponding to the processing server 6N.

Figure 13:
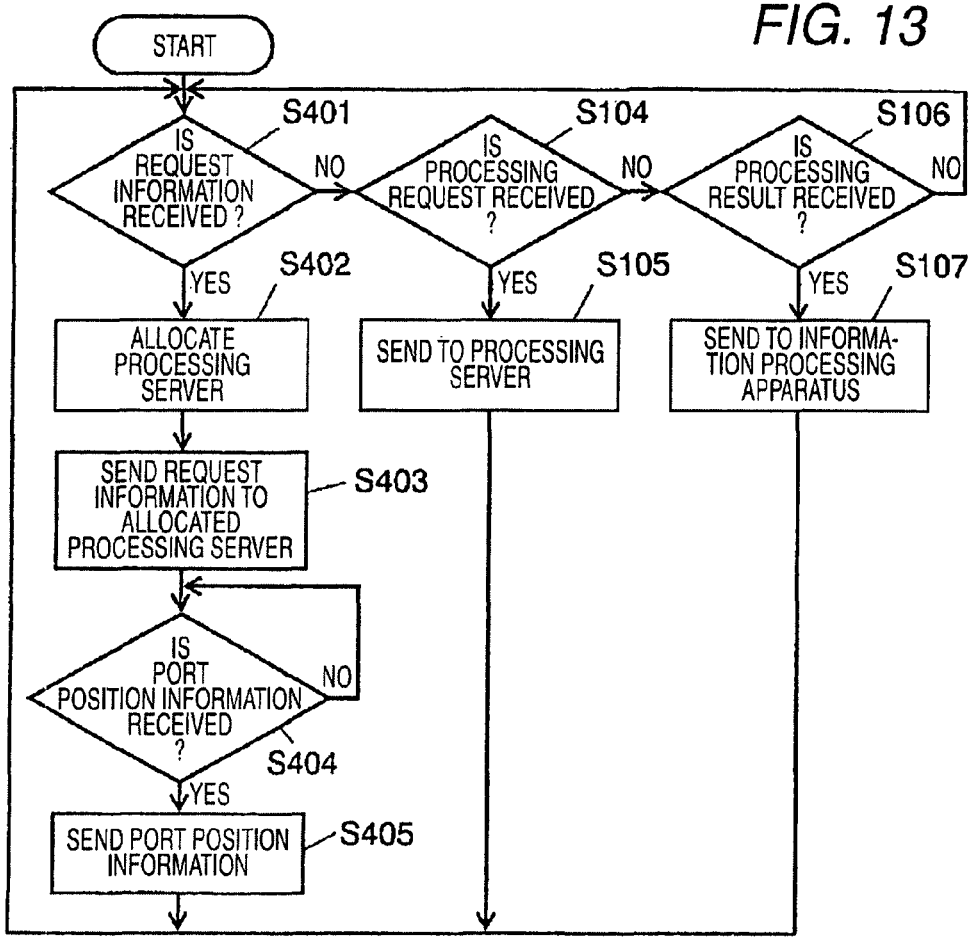
FIG. 13 is a flowchart showing the operation of a connection server according to the embodiment 2 of the invention.

Referring to a flowchart of FIG. 13, the operation of the connection server 5 according to this embodiment will be described below. In the flowchart of FIG. 13, the process from step S104 to step S107 is the same as in the flowchart of FIG. 5 in the embodiment 1, and not described here.

(Step S401) It is judged whether or not the first receiving part 51 receives request information. And if the request information is received, the operation goes to step S402, or if not, the operation goes to step S104.

(Step S402) The load sharing part 52 allocates the information processing apparatus that transmits the request information received at step S401 to any one of the five processing servers 61 to 65.

(Step S403) The first sending part 53 sends the request information received at step S401 to the processing server allocated by the load sharing part 52.

(Step S404) It is judged whether or not the second receiving part 54 receives port position information from the processing server to which the request information is sent at step S403. And if the port position information is received, the operation goes to step S405, or if not, the operation repeats the processing at step S404 until the port position information is received.

(Step S405) The second sending part 55 sends the port position information received by the second receiving part 54 to the information processing apparatus. This information processing apparatus is the information processing apparatus that transmits the request information received by the first receiving part 51 at step S401. And the operation returns to step S401.

In the flowchart of FIG. 13, the process is ended due to an interruption of power off or processing end.

Referring to a flowchart of FIG. 14, the operation of the processing server 61 according to this embodiment will be described below.

(Step S501) It is judged whether or not the request information receiving part 611 receives request information. And if the request information is received, the operation goes to step S502, or if not, the operation goes to step S504.

(Step S502) The port position information sending part 631 reads the port position information stored in the port position information storage part 621.

(Step S503) The port position information sending part 631 sends the read port position information. This sending destination is the information processing apparatus that is the source of the request information. In the case where the port position information stored in the port position information storage part 621 is information indicating the position of two or more connection ports, one connection port may be selected from among the two or more connection ports, and the port position information indicating the position of the selected connection port may be sent, as previously described. And the operation returns to step S501.

(Step S504) It is judged whether or not the communication part 411 receives information of processing request. And if the information of processing request is received, the operation goes to step S505, or if not, the operation returns to step S501.

(Step S505) The processing part 421 performs the processing according to the information of processing request received by the communication part 411 at step S504.

(Step S506) The communication part 411 sends information regarding the processing result obtained at step S505. This sending destination is the information processing apparatus that is the source of the information of processing request. And the operation returns to step S501. The sending destination of the information regarding the processing result may not be the information processing apparatus that is the source of the information of processing request. For example, the communication part 411 may send the information regarding the processing result to another information processing apparatus. Or if it is not required to send the information regarding the processing result, the communication part 411 does not need to perform the processing at step S506.

Figure 14:
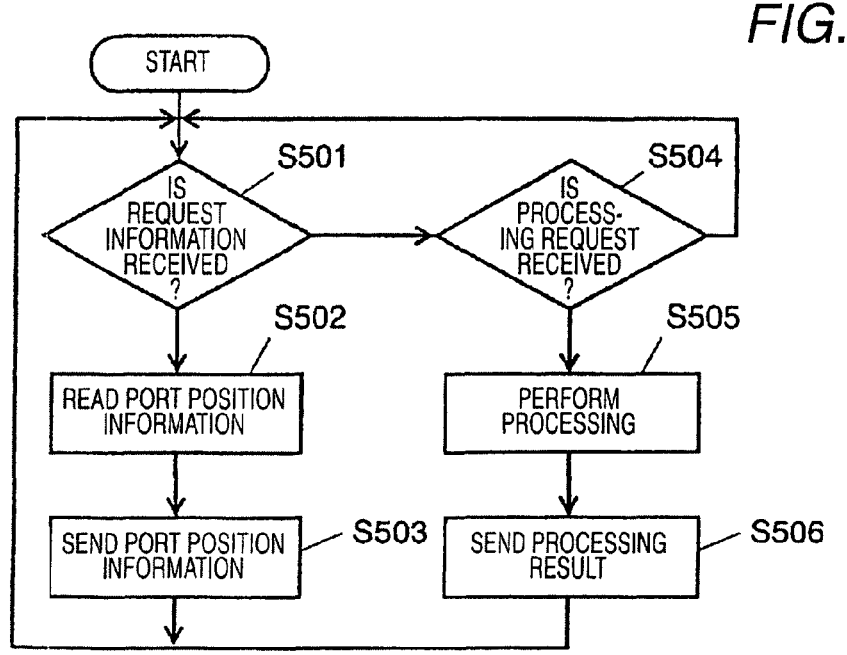
FIG. 14 is a flowchart showing the operation of a processing server according to the embodiment 2 of the invention.

In the flowchart of FIG. 14, the process is ended due to an interruption of power off or processing end.

For other processing servers 62 to 65, the same process as shown in the flowchart of FIG. 14 is performed.

Next, the operation of the communication system according to this embodiment will be described below using a specific example. In this specific example, the IP addresses of each apparatus and each server are the same as in the specific example of the embodiment 1. Needless to say, the connection server 3 corresponds to the connection server 5, and the processing servers 41 to 45 correspond to the processing servers 61 to 65. Also, the settings of the load sharing port and the connection port are the same as in the specific example of the embodiment 1. That is, the connection ports correspond to the processing servers as shown in the table of FIG. 8, and the connection part 34 establishes the connection between the information processing apparatus and the processing server using the translation table as shown in FIG. 10.

Also, the first sending part 53 has an address table that associates the processing server and the address of the processing server as shown in FIG. 15. The first sending part 53 acquires the address corresponding to the processing server allocated by the load sharing part 52 from the address table, and sends request information received by the first receiving part 51 to the address. The port number of the destination of the request information is set to "20000".

Also, the port position information storage parts 621 to 625 of the processing servers 61 to 65 store the port position information indicating the corresponding port numbers as follows.

Port position information storage part 621: 10001 to 10010
Port position information storage part 622: 10011 to 10020
Port position information storage part 623: 10021 to 10030
Port position information storage part 624: 10031 to 10040
Port position information storage part 625: 10041 to 10050

First of all, the request information sending part 11 of the first information processing apparatus 1 sends a packet of request information to the connection server 5 in the same manner as in the specific example of the embodiment 1 (steps S201 and S202). The request information is received by the first receiving part 51 of the connection server 5 (step S401). The processing server 61 is allocated by the load sharing part 52 (step S402). The first sending part 53 acquires the IP address "192.168.0.11" corresponding to the processing server 61 allocated by the load sharing part 52 from the address table as shown in FIG. 15, and sends the packet of request information received by the first receiving part 51 to the IP address "192.168.0.11" and the port number "20000" (step S403). In this case, the source address "155.32.10.10" and the source port number "12345" for the packet of request information are not changed.

The packet of request information is received by the request information receiving part 611 of the processing server 61 (step S501). The port position information sending part 631 reads ten port numbers "10001 to 10010" stored in the port position information storage part 621, and selects the port number "10003" from the ten port numbers (step S502). And the packet of port position information indicating the port number "10003" is constructed, and sent to the first information processing apparatus 1 that is the source of the packet of request information (step S503). The address "155.32.10.10" and the port number "12345" of the first information processing apparatus 1 can be acquired from the header of the packet of request information received by the request information receiving part 611.

The packet of port position information sent from the processing server 61 is received by the second receiving part 54 and passed to the second sending part 55 (step S404). The second sending part 55 converts the address and port number of the source included in the header of the packet of port position information from the address and port number of the processing server 61 to the address "202.223.135.10" and the port number "9500" of the connection server 5. And the packet of port position information is sent to the first information processing apparatus 1 (step S405).

The packet of port position information sent from the connection server 5 is received by the first port position information receiving part 12 of the first information processing apparatus 1 (step S203). Thereafter, the port position information is sent to the second information processing apparatus 2. The operation of the first information processing apparatus 1 and the second information processing apparatus 2 to perform the processes with the processing server 61 is the same as in the specific example of the embodiment 1 and not described here.

As described above, in the communication system according to the embodiment, the port position information can be sent from the processing server, whereby the processing load on the connection server 5 can be reduced. Also, the same effect of the embodiment 1 can be obtained.

While in this embodiment, the connection server 5 performs the transfer process for the request information and the port position information between the processing server and the information processing apparatus using the first receiving part 51, the first sending part 53, the second receiving part 54 and the second sending part 55, and the transfer process for the processing request or processing result between the processing server and the information processing apparatus using the connection part 34, these transfer processes may be performed using the same device for address translation (NAT), or performed by the separate devices.

Also, in this embodiment, when the port position information storage part 621 stores the port position information indicating the position of two or more connection ports, the port position information sending part 631 selects one connection port from among the two or more connection ports, and sends the port position information indicating the position of the selected connection port. However, the selection of the connection port may be made by the component other than the port position information sending part 631. For example, when the connection server 5 receives the port position information indicating the position of the two or more connection ports, which is sent from the processing server 61, one connection port may be selected in the connection server 5, or one connection port may be selected in the information processing apparatus.

Also, though in the above embodiments, the communication system comprises the second information processing apparatus 2, the communication system may not have the second information processing apparatus 2. In this case, for example, the five processing servers may be web servers, and the first information processing apparatus 1 may be a terminal unit that makes access to the web server. Also, in this case, the first information processing apparatus 1 may not have the first port position information sending part 14 for sending the port position information to the second information processing apparatus 2.

Also, in the above embodiments, the first information processing apparatus 1 and/or the second information processing apparatus 2 may make the communication via a communication processing apparatus for making the process for communication. Herein, the communication processing apparatus may have an address translation function, or a fire wall function, for example.

Also, though in the above embodiments, the number of processing servers is five, the number of processing servers may be any number of two or greater.

Also, though in the above embodiments, the connection server and the processing server are connected via the LAN, the connection between the connection server and the processing server is not limited to the LAN. For example, the connection server and plural processing servers may be directly connected without interposing the network such as the LAN. That is, the connection server and the processing servers may be connected in such a form that the connection server and each processing server can communicate, but the processing servers can not communicate. Also, the connection server and plural processing servers may communicate by connecting them via the serial cable or any other dedicated cable without using the IP address, for example. Also, though in the specific examples of the above embodiments, the communication between the connection server and the processing server is made using the port number on the transport layer and the IP address on the network layer, the invention is not limited to such communication. For example, the communication may be made using the MAC address on the data link layer. In this manner, any method for exchanging information between the connection server and the processing server may be employed.

Also, the connection method between the information processing apparatus and the processing server via the connection part 34 in the above embodiments is not limited to those as described above in the specific examples, but any connection method may be employed as far as the connection port and the processing server corresponding to the connection port can be connected. For example, the port number may be also set on the side of the communication circuit 200 of the connection part 34, and the connection part 34 may convert not only the destination address of the packet sent from the communication circuit 100 to the connection part and the port number of the destination but also the source address and the port number of the source. In this case, the communication is made between the information processing apparatus and the processing server in the same manner as the data relay is performed via the connection server. In the case where the connection server and the processing server are connected via the serial cable, a connection process between the information processing apparatus and the processing server may be performed according to its own protocol in the connection server. For example, a process for deleting the header from the packet may be performed.

Also, though in the above embodiments the two information processing apparatuses gains access to the processing server allocated by load sharing, three or more information processing apparatuses may gain access to the processing server allocated by load sharing. For example, if the first information processing apparatus 1 transmits the port position information to other two or more information processing apparatuses, three or more information processing apparatuses have access to the same processing server.

Also, in the above embodiments, the packet of request information or the packet of processing request transmitted from the information processing apparatus may include the apparatus identification information that is information identifying the information processing apparatus or the information capable of specifying a pair of the information processing apparatus of source and the information processing apparatus of destination. In the latter case, the information capable of specifying the pair, and the address and port number of one information processing apparatus and the address and port number of the other information processing apparatus may be held associated in the processing server. In this manner, the structure of the packet does not matter in the above embodiments.

Also, in the above embodiments, the packet sent from the processing server to the information processing apparatus may include the port position information indicating the position of connection port corresponding to the processing server. For example, the packet sent from the processing server to the information processing apparatus may include the port position information every time, or a certain percent of packets sent from the processing server to the information processing apparatus may include the port position information.

Also, in the above embodiments, the request information may include information on the request for processing performed in the processing server. For example, in the embodiment 1, the communication part, not shown, which the connection server 3 has, sends the information on the request for processing to the processing server allocated by the load sharing part 32. The processing server performs the processing according to the information on the request for processing, and sends the execution result to the connection server 3. The connection server 3 sends the execution result and the port position information to the information processing apparatus. Also, in the embodiment 2, the first sending part 53 of the connection server 5 sends the request information including the information on the request for processing to the processing server allocated by the load sharing part 52. The processing server performs the processing according to the information on the request for processing, and sends the execution result and the port position information to the connection server 5. The connection server 5 sends the execution result of the processing in the processing server and the port position information to the information processing apparatus. In this manner, the processing according to the information on the request for processing included in the request information is performed by the processing server. In this case, the request information may include only the information on the request for processing in the processing server. The information on the request for processing at the second time and following is sent to the connection port indicated by the port position information. In this case, the request information sending part 11 and the first communication part 13 of the first information processing apparatus 1 may be the same component.

Also, in the above embodiments, each process (each function) may be centralized on the single apparatus (system), or each process may be decentralized over plural apparatuses. For example, in the above embodiments, the load sharing process is performed in the connection server having the load sharing port, but the load sharing process may be performed in a different apparatus from the connection server. That is, the following information processing method may be performed in the information processing system or the communication system. Namely, this information processing method is an information processing method for use in an information processing system having N processing servers (N is an integer of 2 or greater) and a connection server for connecting an information processing apparatus and any one of the N processing servers, in which the connection ports that are a plurality of ports for the connection server correspond to the N processing servers for every one or more ports, and the connection server establishes a connection between the connection port and the processing server corresponding to the connection port, the method comprising a reception step of receiving request information that is information regarding a request for load sharing, which is sent from the information processing apparatus, a load sharing step of allocating the information processing apparatus that is a source of the request information received at the reception step to any of the N processing servers, and a sending step of sending port position information that is information indicating the position of the connection port corresponding to the processing server allocated at the load sharing step to the information processing apparatus.

Also, another information processing method is an information processing method for use in a connection server making up an information processing system having N processing servers (N is an integer of 2 or greater) and the connection server for connecting an information processing apparatus and any one of the N processing servers, in which the connection ports that are a plurality of ports for the connection server correspond to the N processing servers for every one or more ports, the method comprising a reception step of receiving request information that is information regarding a request for load sharing, which is sent from the information processing apparatus to a load sharing port of the connection server, a load sharing step of allocating the information processing apparatus that is a source of the request information received at the reception step to any of the N processing servers, a sending step of sending port position information that is information indicating the position of the connection port corresponding to the processing server allocated at the load sharing step to the information processing apparatus, and a connection step of establishing a connection between the connection port and the processing server corresponding to the connection port.

Also, another information processing method is an information processing method for use in a connection server making up an information processing system having N processing servers (N is an integer of 2 or greater) and the connection server for connecting an information processing apparatus and any one of the N processing servers, in which the connection ports that are a plurality of ports for the connection server correspond to the N processing servers for every one or more ports, the method comprising a first reception step of receiving request information that is information regarding a request for load sharing, which is sent from the information processing apparatus to a load sharing port of the connection server, a load sharing step of allocating the information processing apparatus that is a source of the request information received at the first receiving step to any of the N processing servers, a first sending step of sending the request information to the processing server allocated at the load sharing step, a second reception step of receiving port position information that is information indicating the position of the connection port corresponding to the processing server and sent from the processing server, a second sending step of sending the port position information received at the second reception step to the information processing apparatus that is the source of the request information, and a connection step of establishing a connection between the connection port and the processing server corresponding to the connection port.

Also, another information processing method is an information processing method for use in any processing server making up an information processing system having N processing servers (N is an integer of 2 or greater) and a connection server for connecting an information processing apparatus and any one of the N processing servers, in which the connection ports that are a plurality of ports for the connection server correspond to the N processing servers for every one or more ports, the method comprising a request information reception step of receiving the request information that is information regarding a request for load sharing, which is sent via the connection server from the information processing apparatus, and a port position information sending step of sending the port position information that is information indicating the position of one or more connection ports corresponding to the processing server to the connection server when the request information is received at the request information reception step.

Also, another information processing apparatus is an information processing method for use in a first information processing apparatus making up a communication system having N processing servers (N is an integer of 2 or greater), a connection server for connecting an information processing apparatus and any one of the N processing servers, and the first information processing apparatus, in which the connection ports that are a plurality of ports for the connection server correspond to the N processing servers for every one or more ports, the method comprising a request information sending step of sending the request information that is information regarding a request for load sharing to the connection server, a port position information reception step of receiving the port position information that is information indicating the position of one or more connection ports corresponding to the processing server allocated in the connection server, and a communication step of communicating with one processing server via a connection port indicated by the port position information received at the port position information reception step.

Also, in the above embodiments, each component may be configured by the dedicated hardware, or the component feasible by software may be implemented by executing a program. For example, a software program recorded on the recording medium such as a hard disk or a semiconductor memory is read and executed by a program execution part such as a CPU to implement each component. The software for implementing an information processing system in the above embodiments is the following program. Namely, this program is a program for performing a process in an information processing system having N processing servers (N is an integer of 2 or greater) and a connection server for connecting an information processing apparatus and any one of the N processing servers, in which the connection ports that are a plurality of ports for the connection server correspond to the N processing servers for every one or more ports, and the connection server establishes a connection between the connection port and the processing server corresponding to the connection port, the program enabling a computer to perform a reception step of receiving request information that is information regarding a request for load sharing, which is sent from the information processing apparatus, a load sharing step of allocating the information processing apparatus that is a source of the request information received at the reception step to any of the N processing servers, and a sending step of sending port position information that is information indicating the position of the connection port corresponding to the processing server allocated at the load sharing step to the information processing apparatus.

Also, the software for implementing a connection server in the above embodiments is the following program. Namely, this program is a program for performing a process in a connection server making up an information processing system having N processing servers (N is an integer of 2 or greater) and the connection server for connecting an information processing apparatus and any one of the N processing servers, in which the connection ports that are a plurality of ports for the connection server correspond to the N processing servers for every one or more ports, the program enabling a computer to perform a reception step of receiving request information that is information regarding a request for load sharing, which is sent from the information processing apparatus to a load sharing port of the connection server, a load sharing step of allocating the information processing apparatus that is a source of the request information received at the reception step to any of the N processing servers, a sending step of sending port position information that is information indicating the position of the connection port corresponding to the processing server allocated at the load sharing step to the information processing apparatus, and a connection step of establishing a connection between the connection port and the processing server corresponding to the connection port.

Also, the software for implementing a connection server in the above embodiments is the following program. Namely, this program is a program for performing a process in a connection server making up an information processing system having N processing servers (N is an integer of 2 or greater) and the connection server for connecting an information processing apparatus and any one of the N processing servers, in which the connection ports that are a plurality of ports for the connection server correspond to the N processing servers for every one or more ports, the program enabling a computer to perform a first reception step of receiving request information that is information regarding a request for load sharing, which is sent from the information processing apparatus to a load sharing port of the connection server, a load sharing step of allocating the information processing apparatus that is a source of the request information received at the first reception step to any of the N processing servers, a first sending step of sending the request information to the processing server allocated at the load sharing step, a second reception step of receiving port position information that is information indicating the position of the connection port corresponding to the processing server and sent from the processing server, a second sending step of sending the port position information received at the second reception step to the information processing apparatus that is the source of the request information, and a connection step of establishing a connection between the connection port and the processing server corresponding to the connection port.

Also, the software for implementing a processing server in the above embodiments is the following program. Namely, this program is a program for performing a process in a processing server making up an information processing system having N processing servers (N is an integer of 2 or greater) and a connection server for connecting an information processing apparatus and any one of the N processing servers, in which the connection ports that are a plurality of ports for the connection server correspond to the N processing servers for every one or more ports, the program enabling a computer to perform a request information reception step of receiving the request information that is information regarding a request for load sharing, which is sent via the connection server from the information processing apparatus, and a port position information sending step of sending the port position information that is information indicating the position of one or more connection ports corresponding to the processing server when the request information is received at the request information reception step.

Also, the software for implementing a first information processing apparatus in the above embodiments is the following program. Namely, this program is a program for performing a process in a first processing apparatus making up a communication system having N processing servers (N is an integer of 2 or greater), a connection server for connecting an information processing apparatus and any one of the N processing servers, and the first information processing apparatus, in which the connection ports that are a plurality of ports for the connection server correspond to the N processing servers for every one or more ports, the program enabling a computer to perform a request information sending step of sending the request information that is information regarding a request for load sharing to the connection server, a port position information reception step of receiving the port position information that is information indicating the position of one or more connection ports corresponding to the processing server allocated in the connection server, and a communication step of communicating with one processing server via a connection port indicated by the port position information received at the port position information reception step.

Each of the above programs does not include, at the sending step of sending the information or the reception step of receiving the information, a process performed by hardware, for example, a process through a modem or an interface card (a process performed only by hardware) at the sending step.

Also, the program may be downloaded from the server and executed, or the program recorded on a predetermined recording medium (e.g., an optical disk such as CD-ROM, a magnetic disk, or a semiconductor memory) may be read and executed.

Also, the program may be executed on a single computer or plural computers. That is, the process may be centralized or decentralized.

Also, this invention is not limited to the above embodiments, but various changes may be made without departing from the spirit or scope of the invention.

In the communication system according to the invention as described above, plural information processing apparatuses have access to one processing server, whereby the communication system is effective as the system for making the load sharing.

The invention claimed is:

1. An information processing system having N processing servers (N is an integer of 2 or greater) and a connection server for connecting an information processing apparatus and any one of said N processing servers, said connection server comprising a plurality of connection ports that are available to receive a processing request transmitted from said information processing apparatus to be transmitted by said connection server and delivered to one or more of said N processing servers;

wherein said connection server comprises:
a first receiving part comprising a load sharing port dedicated for receiving request information that is information regarding a request for load sharing, which is sent from said information processing apparatus to said load sharing port of said connection server;
a load sharing part for allocating a destination processing server selected from among the N processing servers as a destination of a processing request from the information processing apparatus that is a source of the request information received by said first receiving part;
a storage part for storing pre-determined relationships between a plurality of said connection ports of the connection server available to receive the processing request for each of said N processing servers, and the corresponding plurality of ports of each of the N processing servers;
a first sending part that stores a network address for each of the N processing servers that are available to receive said processing request, selects a destination address corresponding to the destination processing server allocated by the load sharing part, and sends said request information to the destination processing server allocated by said load sharing part as a request for the destination processing server to select a connection port of the connection server from two or more available connection ports corresponding to the destination processing server that can be selected as the selected connection port of the connection server, where said processing request from the information process apparatus is to be received to be submitted to the destination processing server;
a second receiving part for receiving port position information transmitted from said destination processing server in response to said request, said port position information comprising the selected connection port of the connection server selected by the destination processing server as a destination port at which the processing request from the information processing apparatus is to be received by the connection server to be delivered to the destination processing server;
a second sending part for sending the port position information received by said second receiving part to the information processing apparatus that is the source of said request information; and
a connection part for establishing a connection between said selected connection port of the connection server and the destination processing server corresponding to said selected connection port; and wherein each of said N processing servers comprises:
a port position information storage part for storing the port position information indicating the plurality of available connection ports corresponding to said processing server that can be selected as the selected connection port of the connection server, wherein, the port position information is obtained from the storage part of the connection server;
a request information receiving part for receiving said request information; and
a port position information sending part for reading the port position information stored in the port position information storage part, selecting a connection port from the plurality of available connection s orts and sending the selected connection port's position information when said request information receiving part receives the request information.

2. A communication system comprising the information processing system according to claim 1 and a first information processing apparatus;

wherein said first information processing apparatus comprises:
a request information sending part for sending the request information to said load sharing port;
a port position information receiving part for receiving said port position information; and
a communication part for communicating with one processing server via said selected connection port indicated by the port position information received by said port position information receiving part.

3. A communication system comprising the information processing system according to claim 1, a first information processing apparatus and a second information processing apparatus;

wherein said first information processing apparatus comprises:
a request information sending part for sending the request information to said load sharing port;
a first port position information receiving part for receiving said port position information;
a first communication part for communicating with one processing server via a connection port indicated by the port position information received by said first port position information receiving part; and a first port position information sending part for sending the port position information received by said first port position information receiving part; and wherein said second information processing apparatus comprises:
a second port position information receiving part for receiving the port position information sent from said first information processing apparatus; and
a second communication part for communicating with said destination processing server via said selected connection port indicated by the port position information received by said second port position information receiving part.

4. The communication system according to claim 3, wherein said first port position information sending part sends said port position information via a predetermined server to said second information processing apparatus.

5. An information processing method for use in a connection server making up an information processing system having N processing servers (N is an integer of 2 or greater) and the connection server for connecting an information processing apparatus and any one of said N processing servers, said connection server utilizing a plurality of connection ports corresponding to each of said N processing servers, said method comprising:
a first reception step of receiving request information comprising a request for load sharing, which is sent from said information processing apparatus to a load sharing port of said connection server;
a load sharing step of allocating, at the connection server, a destination processing server selected from among the N processing servers as a destination of a processing request from the information processing apparatus that is a source of the request information received at said first reception step;
storing, in a storage part provided to the connection server, pre-determined relationships between a plurality of said connection ports of the connection server available to receive the processing request for each of said N processing servers, and a corresponding plurality of ports of each of the N processing servers;
a first sending step of retrieving a destination network address for said destination processing server allocated during said load sharing step, and sending said request information to the destination network address of said destination processing server allocated at said load sharing step as a request for the destination processing server to select a connection port of the connection server from two or more available connection ports corresponding to the destination processing server that can be selected as the selected connection port of the connection server where said processing request from the information process apparatus is to be received to be submitted to the destination processing server;
a second reception step of receiving port position information transmitted from said destination processing server in response to said request, said port position information comprising the selected connection port of the connection server selected by, and sent from said destination processing server as a destination port at which the processing request from the information processing apparatus is to be received by the connection server to be delivered to the destination processing server;
a second sending step of sending the port position information received at said second reception step to the information processing apparatus that is the source of said request information; and a connection step of establishing a connection between said selected connection port of the connection server and the destination processing server corresponding to said selected connection port;
storing, in a port position information storage part of the processing server, the port position information indicating the plurality of available connection ports corresponding to said processing server that can be selected as the selected connection port of the connection server, wherein, the port position information is obtained from the storage part of the connection server;
a request information reception step of receiving, with the processing server, the request information comprising a request for load sharing, which is sent from said information processing apparatus via said connection server that allocated the processing server as a destination processing server;
selecting, with the processing server, a selected connection port of the connection server by reading the port position information stored in the port position information storage part, selecting the connection port from the plurality of available connection ports that are assigned to receive a processing request to be conveyed by the connection server to the destination processing server to be executed by the destination processing server for producing a processing result; and
a port position information sending step of sending port position information comprising the selected connection port corresponding to the destination processing server in response to receiving the request information for receipt by the connection server to be used by the connection server to direct the processing request from the information processing apparatus to the destination processing server that is to receive the processing request.

6. A connection server for connecting an information processing apparatus and any one of N processing servers (N is an integer of 2 or greater) comprising:
a plurality of connection ports corresponding to a corresponding plurality of ports of each of said N processing servers, said plurality of connection ports being available to receive a processing request transmitted from said information processing apparatus to be delivered to a destination processing server selected from among one or more of said N processing servers;
a first receiving part comprising a load sharing port dedicated for receiving request information that is information regarding a request for load sharing, which is sent from said information processing apparatus to said load sharing port of said connection server;
a load sharing part for allocating a destination processing server selected from among the N processing servers as a destination of said processing request from the information processing apparatus that is a source of the request information received by said first receiving part;
a storage part for storing pre-determined relationships between the plurality of said connection ports of the connection server available to receive the processing request for each of said N processing servers, and the corresponding plurality of ports of each of the N processing servers;
a first sending part that stores a network address for each of the N processing servers, selects a destination address corresponding to the destination processing server allocated by the load sharing part, and sends said request information to the destination processing server allocated by said load sharing part as a request for the destination processing server to select a connection port of the connection server from the plurality of available connection ports corresponding to the destination processing server that can be selected as a selected connection port of the connection server, where said processing request from the information process apparatus is to be received to be submitted to the destination processing server;

a second receiving part for receiving port position information transmitted from said destination processing server in response to said request, said port position information comprising selected connection port of the connection server selected by the destination processing server as a destination port at which the processing request from the information processing apparatus is to be received by the connection server to be delivered to the destination processing server;

a second sending part for sending the port position information received by said second receiving part to the information processing apparatus that is the source of said request information; and a connection part for establishing a connection between said selected connection port of the connection server and the destination processing server corresponding to said selected connection port; and wherein each of said N processing servers comprises:

a port position information storage part for storing the port position information indicating the plurality of available connection ports corresponding to said processing server that can be selected as the selected connection port of the connection server wherein, the port position information is obtained from the storage part of the connection server;

a request information receiving part for receiving said request information; and a port position information sending part for reading the port position information stored in the port position information storage part, selecting a connection port from the plurality of available connection ports, and sending the selected connection port's position information when said request information receiving part receives the request information.

7. A processing server that is any one of N processing servers (N is an integer of 2 or greater) connected to an information processing apparatus by a connection server, said connection server comprising:

a plurality of connection ports corresponding to each of said N processing servers, said plurality of connection ports being available to receive a processing request transmitted from said information processing apparatus to be delivered to a destination processing server selected from among one or more of said N processing servers;

a first receiving part for receiving request information that is information regarding a request for load sharing, which is sent from said information processing apparatus to a load sharing port of said connection server;

a load sharing part for allocating a destination processing server selected from among the N processing servers as a destination of said processing request from the information processing apparatus that is a source of the request information received by said first receiving part;

a storage part for storing pre-determined relationships between a plurality of said connection ports of the connection server available to receive the processing request for each of said N processing servers, and the corresponding plurality of ports of each of the N processing servers;

a first sending part that stores a network address for each of the N processing servers, selects a destination address corresponding to the destination processing server allocated by the load sharing part, and sends said request information to the processing server allocated by said load sharing part as a request for the destination processing server to select a connection port of the connection server from two or more available connection ports corresponding to the destination processing server that can be selected as a selected connection port of the connection server where said processing request from the information process apparatus is to be received to be submitted to the destination processing server;

a second receiving part for receiving port position information transmitted from said destination processing server, said port position information comprising a selected connection port of the connection server selected by the destination processing server as a destination port at which the processing request from the information processing apparatus is to be received by the connection server to be delivered to the destination processing server;

a second sending part for sending the port position information received by said second receiving part to the information processing apparatus that is the source of said request information; and a connection part for establishing a connection between said selected connection port and the destination processing server corresponding to said selected connection port; and wherein each of said processing servers comprises:

a port position information storage part for storing the port position information indicating a plurality of available connection ports of the connection server corresponding to said processing server that can be selected as the selected connection port of the connection server, wherein the port position information is obtained from the storage part of the connection server;

a request information receiving part for receiving said request information transmitted by said first sending part of the connection server as said request; and a port position information sending part for reading the port position information stored in the port position information storage part, selecting a connection port from the plurality of available connection s orts and sending the selected connection port's information corresponding to the selected connection port of the connection server when said request information receiving part receives the request information.

8. A first information processing apparatus connected to the information processing system according to claim 1, wherein said first information processing apparatus comprises:

a request information sending part for sending the request information to said load sharing port;

a port position information receiving part for receiving said port position information; and a communication part for communicating with one processing server via a connection port indicated by the port position information received by said port position information receiving part.

9. A second information processing apparatus for use in the information processing system according to claim 1 to which a first information processing apparatus is connected;

wherein said first information processing apparatus comprises:
- a request information sending part for sending the request information to said load sharing port;
- a first port position information receiving part for receiving said port position information;
- a first communication part for communicating with one processing server via a connection port indicated by the port position information received by said first port position information receiving part; and
- a first port position information sending part for sending the port position information received by said first port position information receiving part; and wherein said second information processing apparatus comprises:
- a second port position information receiving part for receiving the port position information sent from said first information processing apparatus; and
- a second communication part for communicating with said destination processing server via said selected connection port indicated by the port position information received by said second port position information receiving part.

10. A first information processing apparatus for use in the information processing system according to claim 1 to which a second information processing apparatus is connected;

wherein said first information processing apparatus comprises:
- a request information sending part for sending the request information to said load sharing port;
- a first port position information receiving part for receiving said port position information;
- a first communication part for communicating with one processing server via a connection port indicated by the port position information received by said first port position information receiving part; and
- a first port position information sending part for sending the port position information received by said first port position information receiving part; and wherein said second information processing apparatus comprises:
- a second port position information receiving part for receiving the port position information sent from said first information processing apparatus; and
- a second communication part for communicating with said destination processing server via said selected connection port indicated by the port position information received by said second port position information receiving part.

11. A non-transitory, computer-readable medium storing a computer program that, when executed by a connection server included in an information processing system that also comprises N processing servers (N is an integer of 2 or greater) performs a process that connects an information processing apparatus to any one of said N processing servers, said connection server utilizing a plurality of connection ports that correspond to each of said N processing servers , said process comprising:

- a first reception step of receiving, at a dedicated load sharing port of the connection server, request information comprising a request for load sharing, which is sent from said information processing apparatus to the load sharing port of said connection server;
- a load sharing step of allocating a destination processing server selected from among the N processing servers as a destination of a processing request to be transmitted from the information processing apparatus that is a source of the request information received at said first reception step;
- storing, in a storage part provided to the connection server, pre-determined relationships between a plurality of said connection ports of the connection server available to receive the processing request for each of said N processing servers, and a corresponding plurality of ports of each of the N processing servers;
- a first sending step of retrieving a destination network address for said destination processing server allocated during said load sharing step, and sending said request information to the destination network address of said destination processing server allocated at said load sharing step as a request for the destination processing server to select a connection port of the connection server from among of the plurality of connection ports of the connection server corresponding to the destination processer server, where said processing request from the information process apparatus is to be received to be submitted to the destination processing server;
- a second reception step of receiving port position information transmitted from said destination processing server, said port position information comprising a selected connection port of the connection server selected by the destination processing server from among the plurality of connection ports stored by the connection server as corresponding to the destination processer server, and sent from said destination processing server as a destination port of the connection server at which the processing request from the information processing apparatus is to be received by the connection server to be delivered to the destination processing server;
- a second sending step of sending the port position information received at said second reception step to the information processing apparatus that is the source of said request information; and
- a connection step of establishing a connection between said selected connection port and the destination processing server corresponding to said selected connection port;
- storing, in a port position information storage part of the destination processing server, the port position information indicating the plurality of available connection ports corresponding to said destination server that can be selected as the selected connection port of the connection server, wherein, the port position information is obtained from the storage part of the connection server;
- a request information reception step of receiving, with said destination server allocated by the connection server to receive the processing request from the information processing device, the request information comprising a request for load sharing, wherein the request information is sent via said connection server from said information processing apparatus that is to subsequently transmit the processing request;
- selecting, with said destination processing server, a connection port of the connection server by reading the port position information stored in the port position information storage part, selecting the connection port from the plurality of available connection ports that are allocated to the destination processing server as available destination ports at which processing requests are to be received by the connection server to be delivered to the destination processing server; and
- a port position information sending step of sending port position information comprising the selected connection port corresponding to the destination processing server in response to receiving the request information for receipt by the connection server to be used by the connection server to direct the processing request from the information processing apparatus to the destination processing server that is to receive the processing request.

* * * * *